(12) United States Patent
Koide et al.

(10) Patent No.: US 6,765,692 B1
(45) Date of Patent: Jul. 20, 2004

(54) IMAGE PROCESSING METHOD AND APPARATUS AND IMAGE FORMING METHOD AND APPARATUS USING THE SAME

(75) Inventors: Jun Koide, Tokyo (JP); Nobuatsu Sasanuma, Yokohama (JP); Yuichi Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/430,015

(22) Filed: Oct. 29, 1999

Related U.S. Application Data

(62) Division of application No. 08/575,141, filed on Dec. 19, 1995, now Pat. No. 6,016,206.

(30) Foreign Application Priority Data

| Dec. 20, 1994 | (JP) | 6-316704 |
| Jul. 12, 1995 | (JP) | 7-175989 |
| Dec. 15, 1995 | (JP) | 7-327334 |

(51) Int. Cl.$^7$ .............................................. G06K 15/00
(52) U.S. Cl. ........................................ 358/1.9; 358/3.1
(58) Field of Search ...................... 358/1.9, 1.2, 1.3, 358/3.1, 2.1, 2.99, 509, 520, 475, 479, 480

(56) References Cited

U.S. PATENT DOCUMENTS

| 4,561,025 A | 12/1985 | Tsuzuki | 358/298 |
| 5,124,802 A | 6/1992 | Ito et al. | 358/298 |
| 5,130,808 A | 7/1992 | Kemmochi | 358/298 |
| 5,148,287 A | 9/1992 | Kemmochi et al. | 358/298 |
| 5,215,845 A | 6/1993 | Yusa et al. | 355/251 |
| 5,359,433 A | 10/1994 | Nagase et al. | 358/466 |
| 5,418,618 A | 5/1995 | Kagawa et al. | 358/298 |
| 5,450,212 A | 9/1995 | Asada | 358/298 |
| 5,574,833 A | 11/1996 | Yoshiaki | 358/456 |
| 5,598,204 A * | 1/1997 | Harringon | 347/251 |
| 6,226,104 B1 * | 5/2001 | Shiomi | 358/1.9 |

FOREIGN PATENT DOCUMENTS

| EP | 0398763 | 11/1990 | |
| JP | 408272953 | * 10/1996 | G06T/5/00 |

* cited by examiner

Primary Examiner—Jerome Grant, II
(74) Attorney, Agent, or Firm—Fitzpatrick, Cella, Harper & Scinto

(57) ABSTRACT

An image can be outputted with a high sharpness without deteriorating a resolution. In order to output an image of a high picture quality while suppressing the occurrence of a moire, an exposure amount is modulated in accordance with pixel density information of the image divided into pixels of a predetermined size by an exposure amount modulating unit in a light scanning unit, thereby expressing an image dark/light state. In this case, in a highlight density region in which a pixel density is equal to or less than $\frac{1}{3}$ of the maximum image density, the density data of two adjoining pixels is modulated by one pixel and the other pixel is not recorded. In a density region in which the image density lies within a range from $\frac{1}{3}$ to $\frac{1}{2}$ of the maximum image density, a part of the density data of one of the two adjoining pixels is transposed to the other pixel. In a density region in which the image density is equal to or larger than $\frac{1}{2}$ of the maximum density, the pixel transposition is not performed.

3 Claims, 12 Drawing Sheets

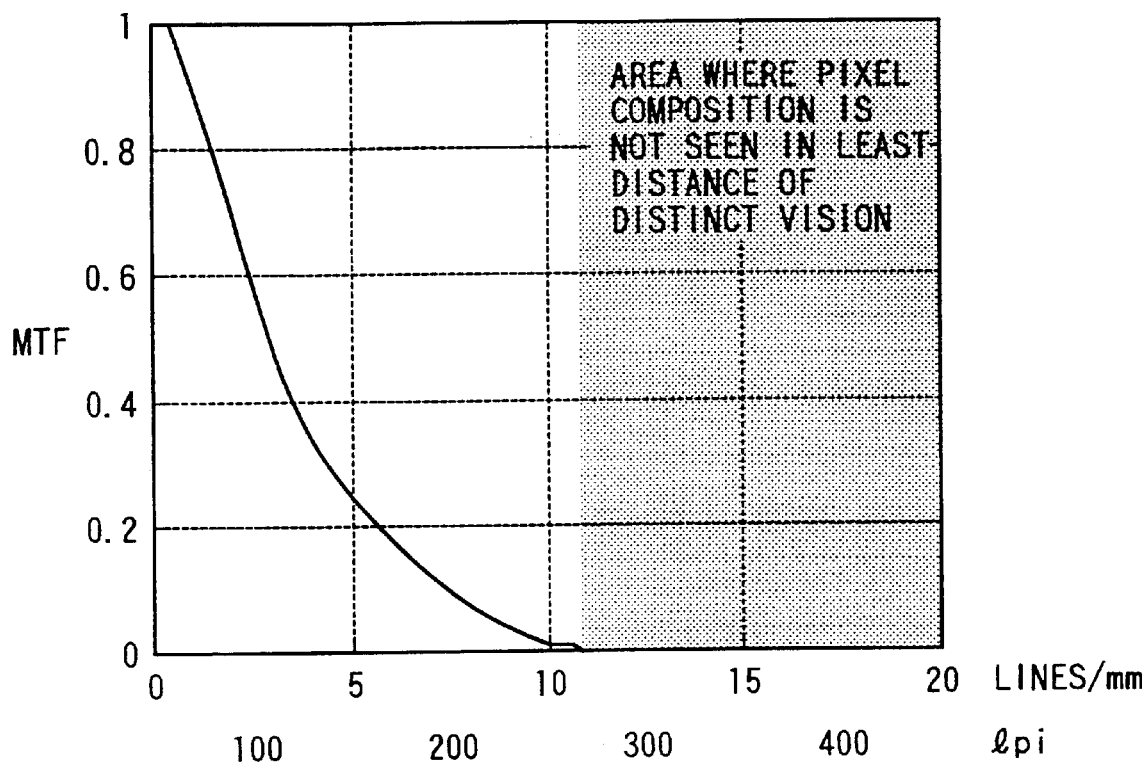

IMAGE PROCESSING METHOD AND APPARATUS AND IMAGE FORMING METHOD AND APPARATUS USING THE SAME

RELATED APPLICATION

This application is a divisional of application Ser. No. 08/575,141, filed Dec. 19, 1995, now U.S. Pat. No. 6,016,206.

BACKGROUND OF THE INVENTION

1. Field of the Invention

The invention relates to image processing method and apparatus and image forming method and apparatus using such method and apparatus.

2. Related Background Art

Among conventional image forming apparatuses, for example, there is an apparatus such that each pixel is expressed as a density by multi-values in a dividing image of predetermined pixels, what is called a digital image, by an electrophotography process. Exposure amounts of all pixels are modulated in accordance with an image signal value of each pixel, thereby reconstructing image information at a high fidelity. When the exposure amounts of all pixels are modulated, however, there is a problem such that a density gradation of an output image becomes nonlinear (generally, not enough density is obtained in a highlight density region and a gamma value is large in a halftone density region) for an input image signal, so that a picture quality deteriorates.

As another example of the image forming apparatus, there is an apparatus such that in the case of a pixel composition of an input image of a pixel density of, for example, 400 d.p.i., an output image is set to 200 d.p.i. in the main-scanning direction and to 400 l.p.i. in the sub-scanning direction (direction perpendicular to the main scanning direction), and the pixel density in the main-scanning direction (direction for light scanning) is set to the half density and a density gradation of the output image is made to linearly correspond to the input image, thereby forming an image.

In the above conventional image forming apparatus, however, there are the following problems. Namely, when the pixel density in the main-scanning direction of the output image is reduced to ½ of the pixel density in the sub-scanning direction, the whole resolution of the image is reduced to ½ and sharpness of the image deteriorates. In case of outputting image data of a high spatial frequency such as a mesh image or the like, an interference with a recording pixel density easily occurs, and a moire strongly appears.

To solve the above problems, in U.S. Pat. Nos. 5,148,287, 5,130,808, and the like, there is disclosed a technique such that when a density level is low, by concentrating the dots, a density reproducibility in a highlight density region is improved.

However, according to the method disclosed in the above two patents, there are problems such that what is called a density jump occurs at a boundary between the density region where the dots are concentrated and the density region where the dots are not concentrated. Such a density jump is observed as a pseudo outline by the human eyes, and the picture quality deteriorates.

SUMMARY OF THE INVENTION

The invention is made in consideration of such problems and it is an object of the invention to provide image processing method and apparatus and image forming method and apparatus which can improve a gradation reproducibility.

Another object of the invention is to provide image processing method and apparatus and image forming method and apparatus which can improve a gradation reproducibility by a construction that is simpler than the conventional one.

Still another object of the invention is to provide image processing method and apparatus and image forming method which can prevent a generation of a pseudo outline and can preferably form an image even in a highlight density region.

Under the above objects, according to a preferred embodiment of the invention, there is provided an image forming apparatus comprising: input means for inputting digital image data every pixel; evaluating means for evaluating a density of the image data inputted by the input means by at least three stages; concentrating means for concentrating the digital image data every pixel in accordance with the stage evaluated by the evaluating means; modulating means for performing a signal modulation in accordance with a level of the digital image data concentrated by the concentrating means; and image forming means for forming an image in accordance with the digital image data modulated by the modulating means.

Further, another object of the invention is to improve a gradation of an image forming apparatus of an electrophotography system.

Further, another object of the invention is to provide a novel image processing method for an image forming apparatus of the electrophotography system.

The above and other objects and features of the present invention will become apparent from the following detailed description and the appended claims with reference to the accompanying drawings.

BRIEF DESCRIPTION OF THE DRAWINGS

FIG. 18 is a diagram showing visual sense MTF characteristics in least distance of distinct vision; and FIG. 19 is a diagram showing data of an apparatus which was experimented by the present inventors.

DETAILED DESCRIPTION OF THE PREFERRED EMBODIMENTS

Embodiments of the invention will now be described in detail hereinbelow with reference to the drawings.

Embodiment 1

Figure 1:
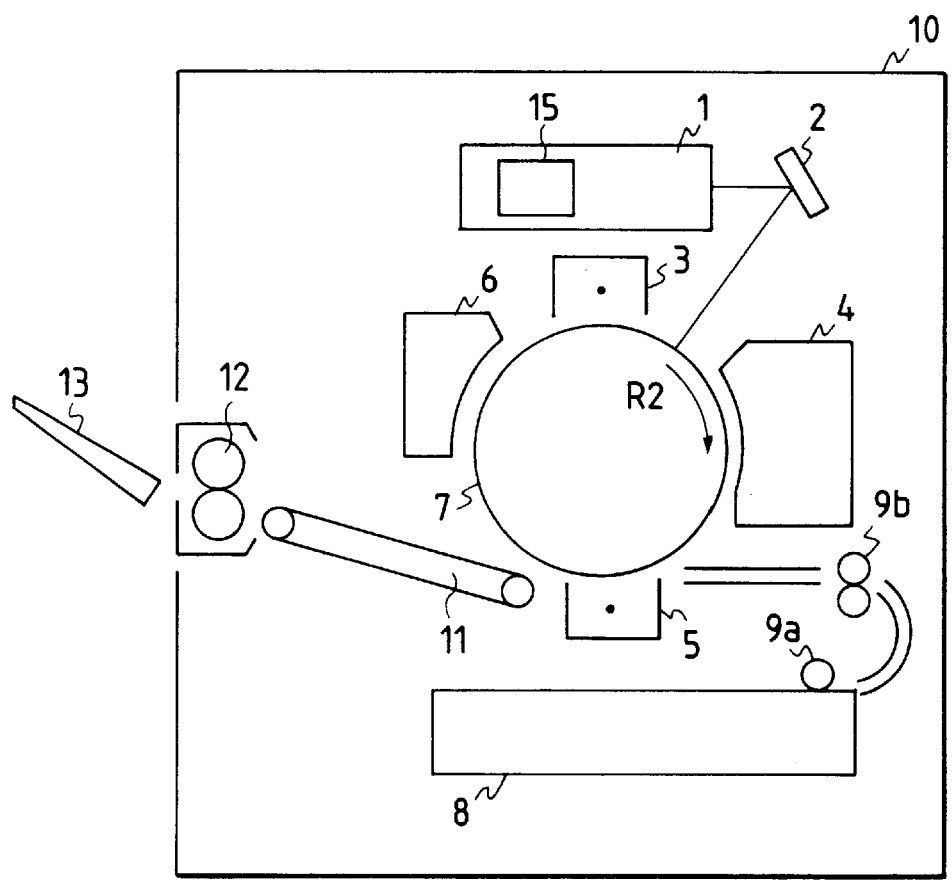
FIG. 1 is a schematic constructional diagram showing an embodiment of an image forming apparatus according to the invention.

First, a schematic construction of a laser beam printer as an image forming apparatus according to an embodiment of the invention with reference to FIG. 1. The laser beam printer has a photosensitive drum 7 as a photosensitive material which is supported in a printer main body 10 so as to be rotatable in the direction shown by an arrow R2. A laser beam which was modulated and oscillated by light scanning means (light scanning apparatus) 1 is optically scanned to the photosensitive drum 7 through a return mirror 2. Around the photosensitive drum 7, there are arranged: charging means 3 for uniformly charging the surface of the photosensitive drum 7 along a rotating direction of the photosensitive drum 7; developing means 4 for forming a toner image by depositing a toner to an electrostatic latent image formed on the photosensitive drum 7; transfer charging means 5 for transferring the toner image on the photosensitive drum 7 onto a transfer material; and cleaning means 6 for rotating the toner remaining on the photosensitive drum 7 after the toner image was transferred. Further, a sheet cassette 8 on which transfer material is stacked is attached in the printer main body 10. A paper feed roller 9a and a registration roller 9b to feed the transfer material in the sheet cassette 8 to a position between the photosensitive drum 7 and the transfer charging means 5 are provided in the printer main body 10.

A dot image forming block (not shown) for analyzing code data from a host computer (not shown) and drawing a dot image into a memory is provided for the light scanning apparatus 1. Exposure amount modulating means 15 for modulating an exposure amount in accordance with image information and expressing a light/dark state of an image is provided for the dot image forming block. In case of a highlight density region as density data in which an image density which is inputted is equal to or less than ⅓ of the maximum image density, the exposure amount modulating means 15 modulates density data of two pixels by one (a) [pixel shown by "a" in FIG. 2] of the two pixels and forms one dot and doesn't record the other pixel (b) [pixel shown by "b" in FIG. 2]. In case of a region from a halftone density region to a dark density region in which the image density that is inputted is equal to or larger than ⅓ of the maximum image density, the exposure amount modulating means 15 individually modulates each pixel, thereby forming an image.

A method of forming an image by the laser beam printer of the embodiment constructed as mentioned above will now be described.

First, the light scanning apparatus 1 converts the density data based on the image information to an exposure amount of the laser beam through the exposure amount modulating means 15. The laser beam which was modulated and oscillated by the light scanning apparatus 1 optically scans the surface of the photosensitive drum 7 which rotates in the direction of the arrow R2 in the diagram through the return mirror 2, thereby forming a potential latent image onto the photosensitive drum. In this instance, however, it is assumed that the surface of the photosensitive drum 7 has previously been charged by the charging means 3. A toner as a developing agent is deposited onto the drum surface by the developing means 4 in accordance with the surface potential of the photosensitive drum 7 on which the latent image was potentially formed, thereby forming a visible image. During this interval, a transfer material is pulled out from the sheet cassette 8 of the transfer material by the paper feed roller 9a and is conveyed by the registration roller 9b at a timing synchronized with the rotation of the photosensitive drum 7. The transfer charging means 5 transfers the visible image formed on the surface of the photosensitive drum 7 onto the transfer material at a timing matched with the timing to convey the transfer material. The transfer material to which the visible image was transferred is conveyed to fixing means 12 by conveying means 11. After the toner was fixed to the transfer material by the fixing means 12, the transfer material is ejected out onto a paper ejection tray 13 provided so as to be projected to the outside of the printer main body 10. After completion of the transfer step, the toner remaining on the surface of the photosensitive drum 7 is removed by the cleaning means 6. An image is formed while repeating the series of processing steps as mentioned above.

A method of modulating the exposure amount in accordance with the image information and expressing a dark/light state of the image will now be described with reference to FIGS. 2 and 3.

Figure 2:
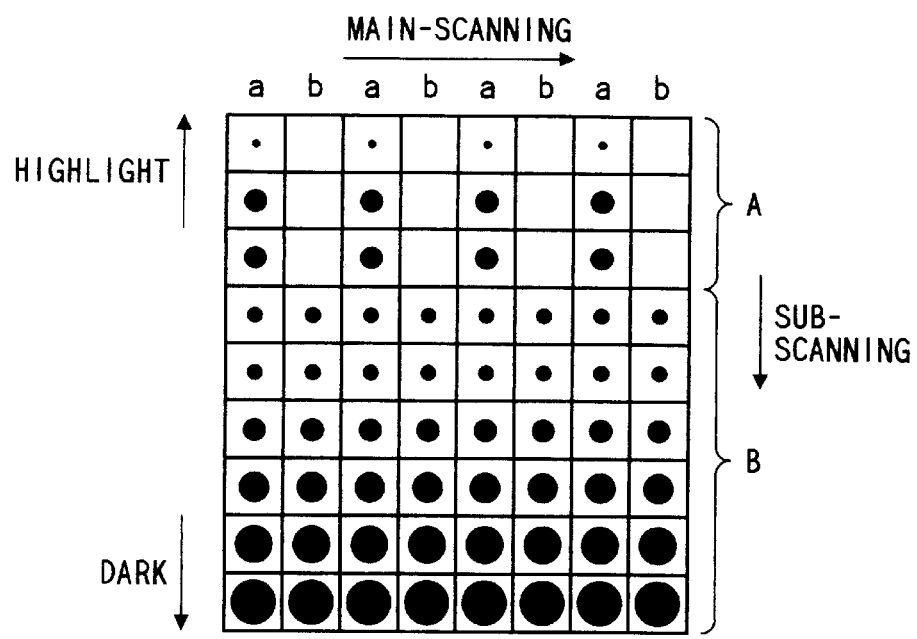
FIG. 2 is an explanatory diagram showing an image forming method of the first embodiment according to the invention.

First, the image is decomposed to pixels arranged in the main-scanning direction of a raster-shape as shown in FIG. 2. In case of a highlight density region as density data in which image densities of two pixels a and b which are adjoining in the main-scanning direction are, for example, equal to or less than ⅓ of the maximum image density (in case of the data in a range in the sub-scanning direction shown at A in FIG. 2), the exposure amount modulating means 15 on the light scanning apparatus 1 in the embodiment 1 adds the density data of two pixels, modulates the addition result by one pixel a, forms one dot, and doesn't perform the recording of the other pixel b. In case of a region from a halftone density region to a dark density region as density data in which the image density that is inputted is equal to or higher than ⅓ or the maximum image density (in case of data in a range in the sub-scanning direction shown at B in FIG. 2), the exposure amount modulating means 15 individually modulates each pixel and forms an image.

Figure 3:
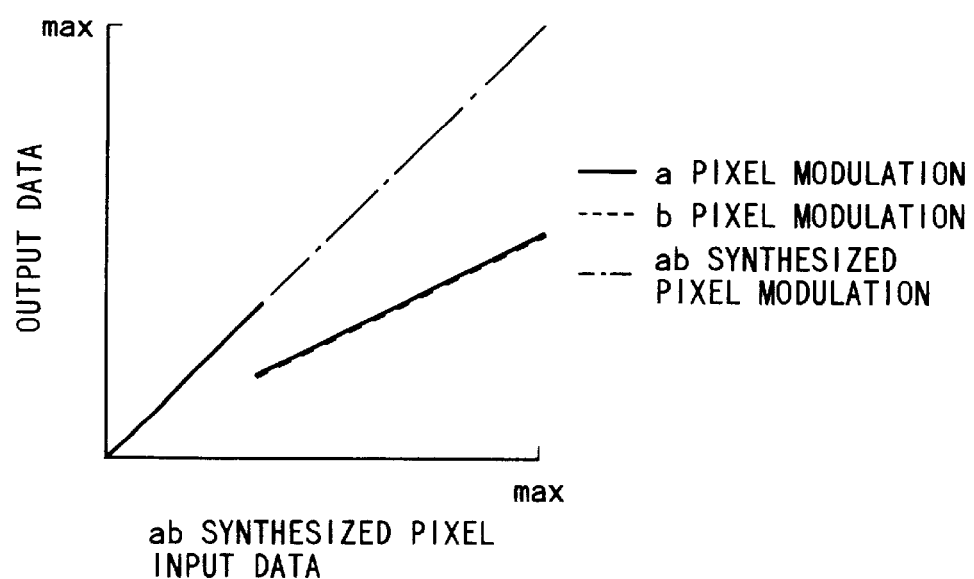
FIG. 3 is a characteristics graph showing each pixel modulating characteristics of the invention.

FIG. 3 shows the relation of the individual or synthesized output data which is modulated for the synthesized input data of the two adjoining pixels a and b. According to the relation, a dot which is formed by modulating the density data of the two adjoining pixels by one of the two pixels is dense and large. On the other hand, in case of forming an image by modulating all of the pixels, the dot is thin and small and an exposure amount which is generated for each pixel is small, so that the toner is not deposited. Therefore, this embodiment reduces the inconvenience in which the image is extinguished in the highlight density region or a coarseness of the image occurs because a size of each dot that is formed by the toner doesn't become stable and varies.

A density reproducibility and a density uniformity in the highlight density region are improved.

Embodiment 2

A method of modulating the exposure amount in accordance with the image information on the basis of FIGS. 4 and 5 will now be described.

Figure 4:
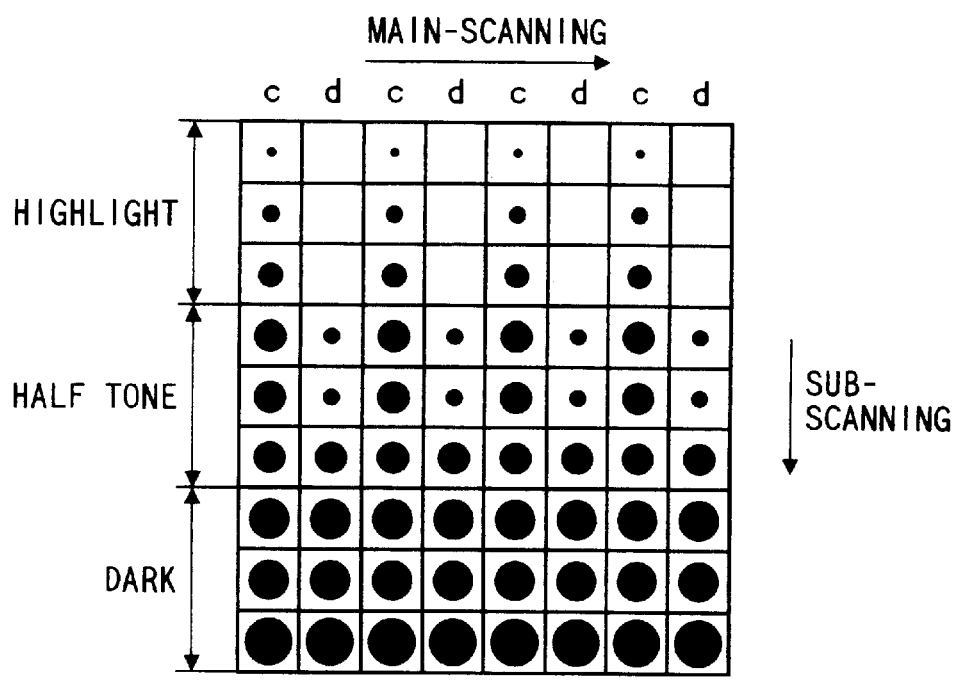
FIG. 4 is an explanatory diagram showing an image forming method of the second embodiment of the invention.
Figure 5:
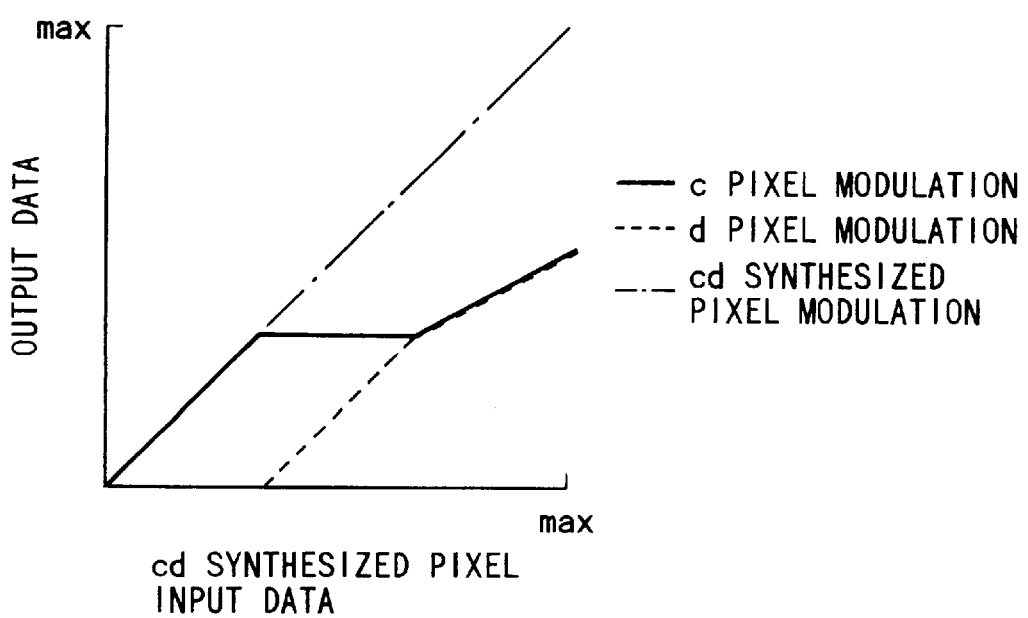
FIG. 5 is a characteristics graph showing each pixel modulating characteristics of the invention.

In case of the highlight density region in which the image densities of the two adjoining pixels in the main-scanning direction are equal to or less than ⅓ of the maximum image density as shown in FIG. 4, in a manner similar to the embodiment 1, the density data of the two adjoining pixels is modulated by one pixel c [pixel shown by "c" in FIG. 4] and two dots are formed and the other pixel d [pixel shown by "d" in FIG. 4] is not recorded. In case of a halftone density region in which the image densities lie within a range from ⅓ to ⅔ of the maximum image density, the exposure amount modulating means 15 which is used in the embodiment 2 sets the pixel c which was modulated in the highlight density region to a fixed value as shown in FIG. 5 and modulates the density data in which the density data of one pixel c is subtracted from the density data of the two adjoining pixels by the other pixel d. Further, in a dark density region in which the image densities are equal to or higher than ⅔ of the maximum image density, each pixel is individually modulated and an image is formed. Since the modulation of each pixel continuously changes for the input density data as shown in FIG. 5, a pseudo outline is not generated in the output image. Specifically speaking, for example, when forming a gradation image whose gradation smoothly changes, in the foregoing embodiment described by using FIG. 2, there is a possibility such that pseudo outlines are generated in both of the density region shown at A and the density region shown at B. However, according to the embodiment shown in FIG. 4, such a possibility can be reduced. On the other hand, however, since one modulation is performed by two adjoining pixels in a region from the highlight density region to the halftone density region, namely, up to the density region in which the image densities are less than ⅔ of the maximum image density, resolutions in the region from the highlight density region to the halftone density region deteriorate, a sharpness deteriorates, and a generation intensity of a moire increases.

In case of forming an image by using the exposure amount modulating means 15 according to the embodiments 1 and 2, by using image data whose pixel density is equal to or larger than 600 d.p.i., the pixel density in the main-scanning direction in the highlight density region corresponds to 300 d.p.i. The dot arrangement of 300 d.p.i. cannot be distinguished by the human eyes. There is, consequently, also an advantage such that by using image data of 600 d.p.i. or higher, even if the method shown in the embodiment is used, the deterioration in picture quality due to the appearance of the image structure is not caused.

According to the embodiment as mentioned above, the density data of two pixels is modulated by one of the two pixels and the other pixel is not recorded, thereby reducing the pixel density in only the highlight density region to the half in the main-scanning direction. Therefore, even if the deterioration in resolution or the increase in moire intensity occur in the highlight density region in which the image densities are equal to or less than ⅓ of the maximum image density, since the density region is the highlight density region, such phenomena are visually inconspicuous. Thus, a sharpness as a whole output image doesn't deteriorate, the generation intensity of the moire is not raised, the image in the highlight density portion can be stably outputted, and an image of a high picture quality can be outputted.

In the embodiment, in the highlight density region, the density data of two adjoining pixels is modulated by the density data of one of the two pixels and the other pixel is not recorded. However, it is also possible to modulate the density data of a predetermined number of continuous pixels by the density data of some of the pixels and not to record the remaining pixels. With this construction, further, the resolution doesn't deteriorate and an image of a higher sharpness can be obtained.

As described above, according to the image forming apparatus of the embodiment, the light scanning means for forming the latent image onto the photosensitive material is provided with the exposure amount modulating means for modulating the exposure amount in accordance with the pixel density information and expressing a dark/light state of the image for the pixels divided into a predetermined size on the photosensitive material. The exposure amount modulating means divides the image density region into the highlight density region, halftone density region, or dark density region, modulates the density data of a predetermined number of continuous pixels in the light scanning direction by the density data of some of the pixels in the highlight density region, and doesn't record the remaining pixels. It is possible to prevent the formation of a dot which is so small that the image formation cannot be stably performed. When the user tries to form a dot such that the image formation cannot be stably performed, dots are formed at random or dots are not formed. Therefore, an image which the viewer feels has too much noise is produced. According to the embodiment, consequently, a coarseness of the image due to a density deterioration or a variation of the sizes of dots is improved.

In the region from the halftone density region to the dark density region, by individually modulating each pixel, the resolution doesn't deteriorate and an image with a high sharpness can be outputted. An image of the highlight density portion can be stably outputted without raising the generation intensity of the moire. An image of a high picture quality can be outputted.

According to the embodiment 2 shown in FIG. 4, further, in the halftone density region, one pixel modulated in the highlight density region is set to the fixed value and as for the other pixel, the data in which the fixed value is subtracted from the density data of two pixels is modulated, so that a pseudo outline is not generated in the output image. In the dark density region, by individually modulating each pixel, the resolution in the dark density region doesn't deteriorate. Thus, the image of a high sharpness can be outputted. The generation intensity of the moire is also suppressed. The image of a high picture quality can be outputted.

Figure 6:
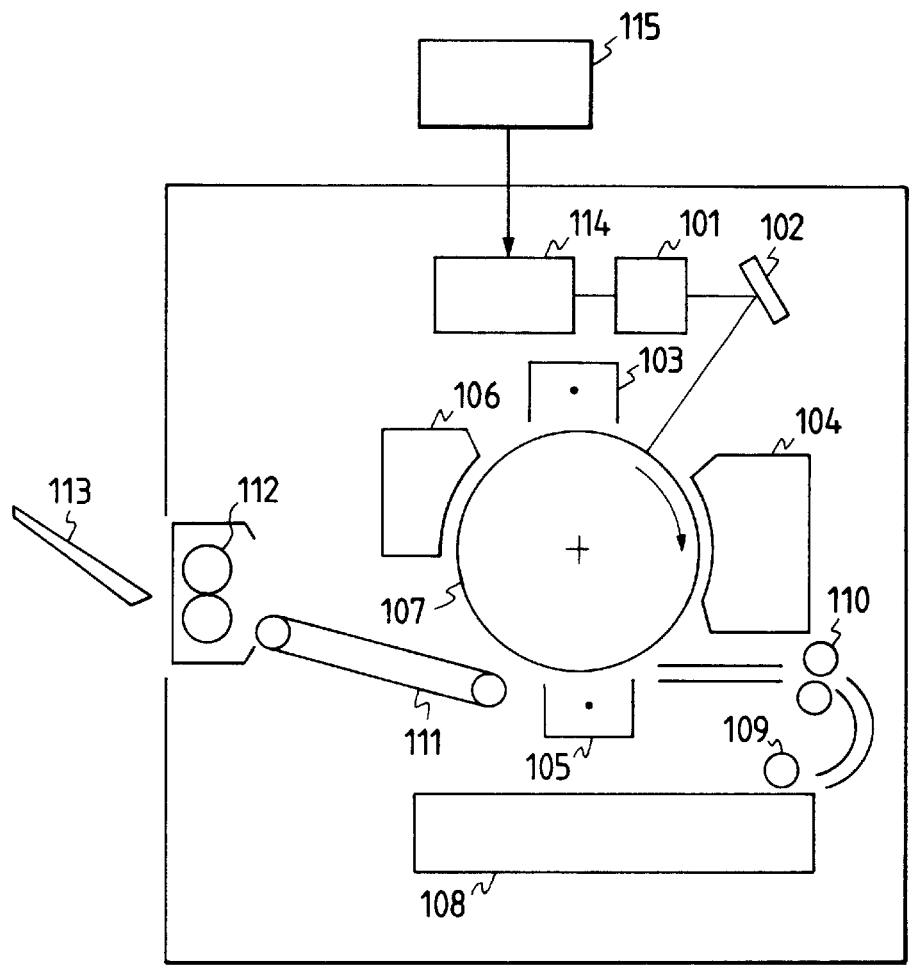
FIG. 6 is a diagram showing a schematic construction of an image forming apparatus of a form of the third embodiment of the invention.

FIG. 6 is a diagram showing a schematic construction of an image forming apparatus of a form of the third embodiment of the invention. Although a construction of the image forming apparatus is substantially the same as that of the apparatus shown in FIG. 1, it will be explained hereinbelow.

Reference numeral 101 denotes a light scanning unit having a laser diode and a laser diode oscillation control circuit (not shown). The light scanning unit 101 oscillates in accordance with image data which is transferred from a control unit 114 and forms an electrostatic latent image onto a drum cylinder 107.

Reference numeral 102 denotes a return mirror for scanning a laser beam from the light scanning unit 101 onto the drum cylinder 107.

Reference numeral 103 denotes a charging unit for charging a photosensitive conductor material on the surface of the drum cylinder 107.

Reference numeral 104 denotes a developing unit for developing the electrostatic latent image formed on the photosensitive conductor material on the surface of the drum cylinder 107.

Reference numeral 105 denotes a transfer unit for transferring the formed image which was developed by the developing unit 104 onto a transfer material.

Reference numeral 106 denotes a cleaning unit for removing the remaining toner or the like after completion of the transfer by the transfer unit 105.

Reference numeral 107 denotes the drum cylinder. A photosensitive conductor material is coated onto the surface of the drum cylinder 107. The drum cylinder 107 rotates in the direction shown by an arrow in the diagram.

Reference numeral 108 denotes a cassette to supply transfer material (not shown); 109 a paper feed roller to take out the transfer material (not shown) from the cassette; 110 a conveying roller for conveying the transfer material (not shown); and 111 a conveying belt to convey the transfer material.

Reference numeral 112 denotes a fixing unit for fixing the image formed by transferring the developing agent onto the transfer material.

Reference numeral 113 denotes an ejection tray to hold the transfer material ejected to the outside of the apparatus.

Reference numeral 114 denotes the control unit for performing a density process, which will be explained hereinafter, to the image read data inputted from a scanner unit 115 and transferring the processed data to the light scanning unit 101.

Reference numeral 115 denotes the scanner unit for optically reading an original image, converting the signal obtained to a digital signal, and transferring to the control unit 114.

A schematic operation of the image forming apparatus having the above construction will now be described. In accordance with an output timing of the image data, the light scanning unit 101 operates in a manner such that an oscillated light which is generated from a built-in laser diode (not shown) is reflected by the return mirror 102. An electrostatic latent image by the oscillated light onto the photosensitive conductor material on the surface of the drum cylinder 107 which is rotated in the direction of the arrow in the diagram and whose surface was charged by the charging unit 103. In accordance with the surface potential of the photosensitive conductor material on which the electrostatic latent image was formed, a developing agent (for example, toner) is deposited by the developing unit 104, thereby forming a visible image and developing the electrostatic latent image. The visible image deposited on the surface of the photosensitive conductor material is transferred by the transfer unit 105 to the transfer material (not shown) which is conveyed by the conveying roller 110 at a predetermined timing. The transfer material (not shown) to which the visible image was transferred is conveyed by the conveying belt 111 to the fixing unit 112. The visible image transferred onto the transfer material is semipermanently fixed by the fixing unit 112. After that, the transfer material is ejected onto the ejection tray 113 on the outside of the apparatus. The developing agent remaining on the drum cylinder 107 is removed by the cleaning unit 106 by rotating the drum cylinder 107.

In the form of the embodiment, although the image data which is transferred to the control unit 114 is the image data read out from the scanner, namely, although the apparatus shown in FIG. 6 is a copying apparatus, the embodiment can be also easily applied to a printer which handles image data that is transferred from a host computer.

A control construction of the scanner unit which is built in the apparatus and executes image processes will now be described.

Figure 7:
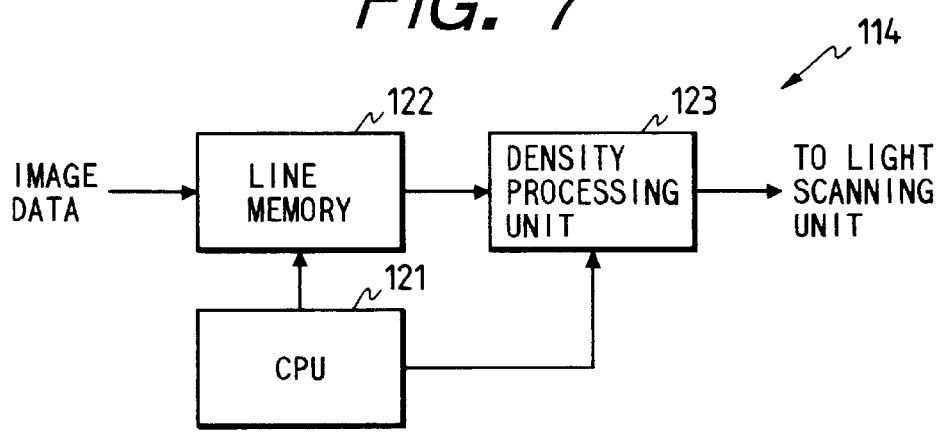
FIG. 7 is a block diagram showing a main section of a scanner unit of the form of the embodiment shown in FIG. 6.

FIG. 7 is a block diagram showing a main section of the control unit 114 of the form of the embodiment.

Reference numeral 121 denotes a CPU for performing controls of a reading of image data into a line memory 122, a process of a density processing unit 123, a transfer of the processed image data to the light scanning unit, and the like.

Reference numeral 122 denotes a line memory for storing the image data inputted from the scanner unit 115.

Reference numeral 123 denotes the density processing unit for detecting density data of the image data that is sequentially read out from the line memory 122 and executing processes of the density data of the form of the embodiment, which will be explained hereinlater. The density processed data is outputted to the light scanning unit 101.

The density process of the image data in the form of the embodiment will now be described with reference to FIGS. 8 to 11.

It is now assumed that the image forming apparatus which is used in the form of the embodiment can express sixteen gradations.

In the density processing unit 123, in the case where the density data of two adjoining pixels in the raster direction (main-scanning direction) is a and b and the image density is equal to or less than the halftone density, namely, in the case where the image density is smaller than C [C denotes the maximum density of an image to be formed by the image forming apparatus] (C>a+b), the density data of the pixel of density data b is transposed to the pixel of density data a in accordance with arithmetic operations of the following equations (1), thereby newly converting to the pixels having density data of a' and b'.

All of the decimal portions of the values which are calculated by the equations (1) are omitted.

$$a'=a+b\{1-(a+b)/C\}$$

$$b'=b\{(a+b)/C\} \quad (1)$$

Figure 8:
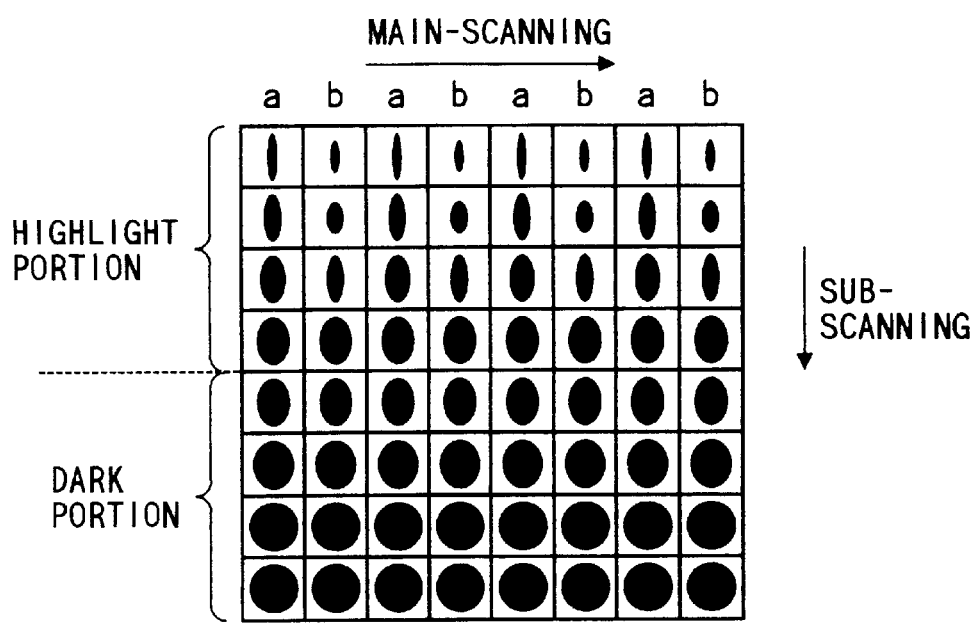
FIG. 8 is a diagram showing a pixel modulation arrangement of the form of the embodiment.

By performing the above process, the output result in each gradation of the pixel of the density data a and the pixel of the density data b is as shown in FIG. 8. In FIG. 8, the pixels which are adjoining in the main-scanning direction have the same value. As will be also obviously understood from the diagram, in the highlight portion (the 0th to 7th gradations), the density data of the pixel of the density data b is transposed to the pixel of the density data a in accordance with the equations (1) and the resultant data is generated as output image data, so that a difference occurs between the output results of the pixel of the density data a and the pixel of the density data b. On the other hand, in the dark portion (the 8th to 15th gradations), the output results of the output image data of the pixel of the density data a and the pixel of the density data b are the same.

Figure 9:
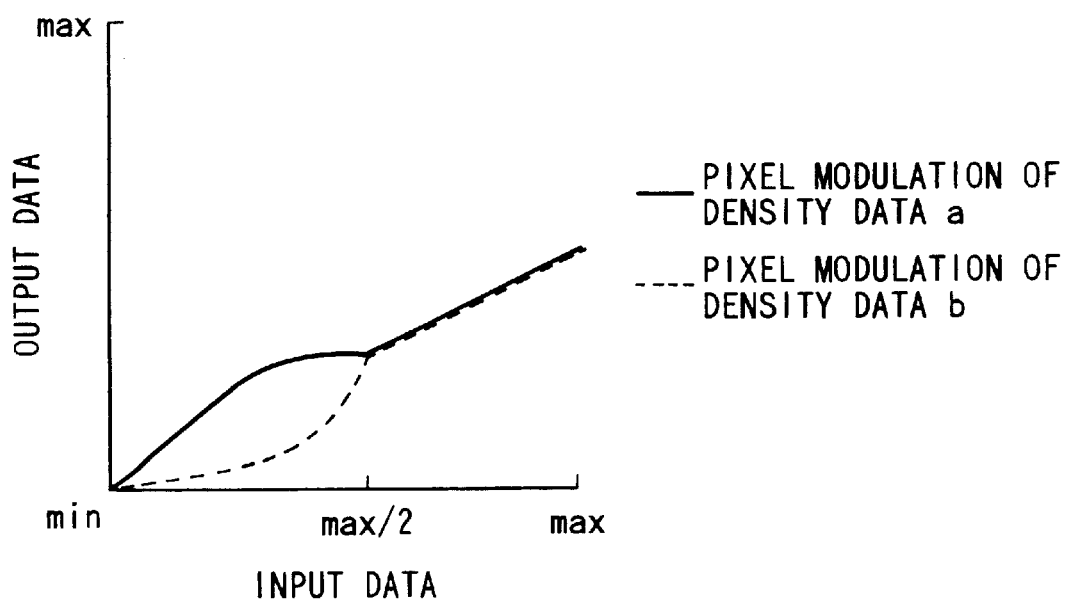
FIG. 9 is a diagram showing pixel modulating characteristics of the form of the embodiment.

For example, when the density data of a and b are the same, the output image data for the input image data of the pixel of the density data a and the pixel of the density data b have characteristics as shown in FIG. 9. As will be also obviously understood, a transposition ratio of the density data from the pixel of the density data b to the pixel of the density data a gradually increases from the density region in which the density data of each pixel has the half value of the maximum value, namely, from the halftone density region to the highlight density region. When the density data is minimum, all of the density data of the pixels of the density data b is transposed to the pixel of the density data a.

Figure 10:
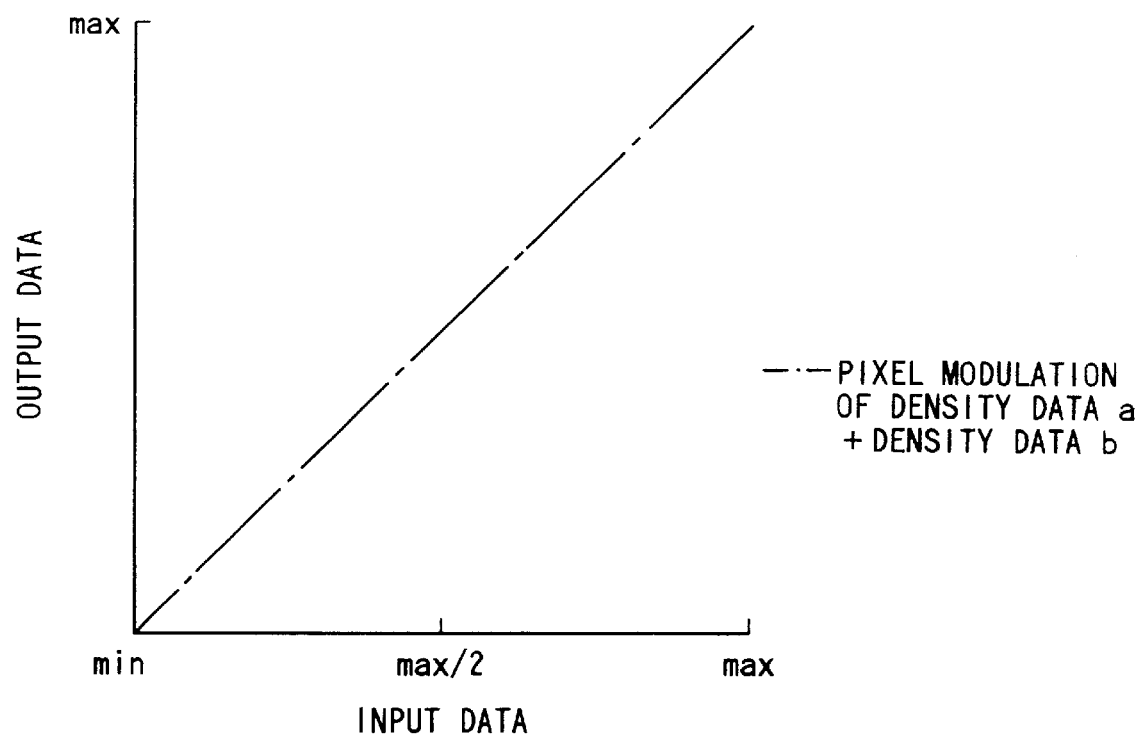
FIG. 10 is a diagram showing pixel modulating characteristics of the form of the embodiment.

The relation between the input and output of the image data in which the pixel of the density data a and the pixel of the density data b are added is linear as shown in FIG. 10. By the above process, the density of the output data is preserved, the pixel of the density data a and the pixel of the density data b lie within a low density region and the pixel densities equivalently decrease, so that the gradation reproducibility in the low density region is improved. The resolution is preserved.

The above process will now be explained with reference to a flowchart shown in FIG. 11.

Figure 11:
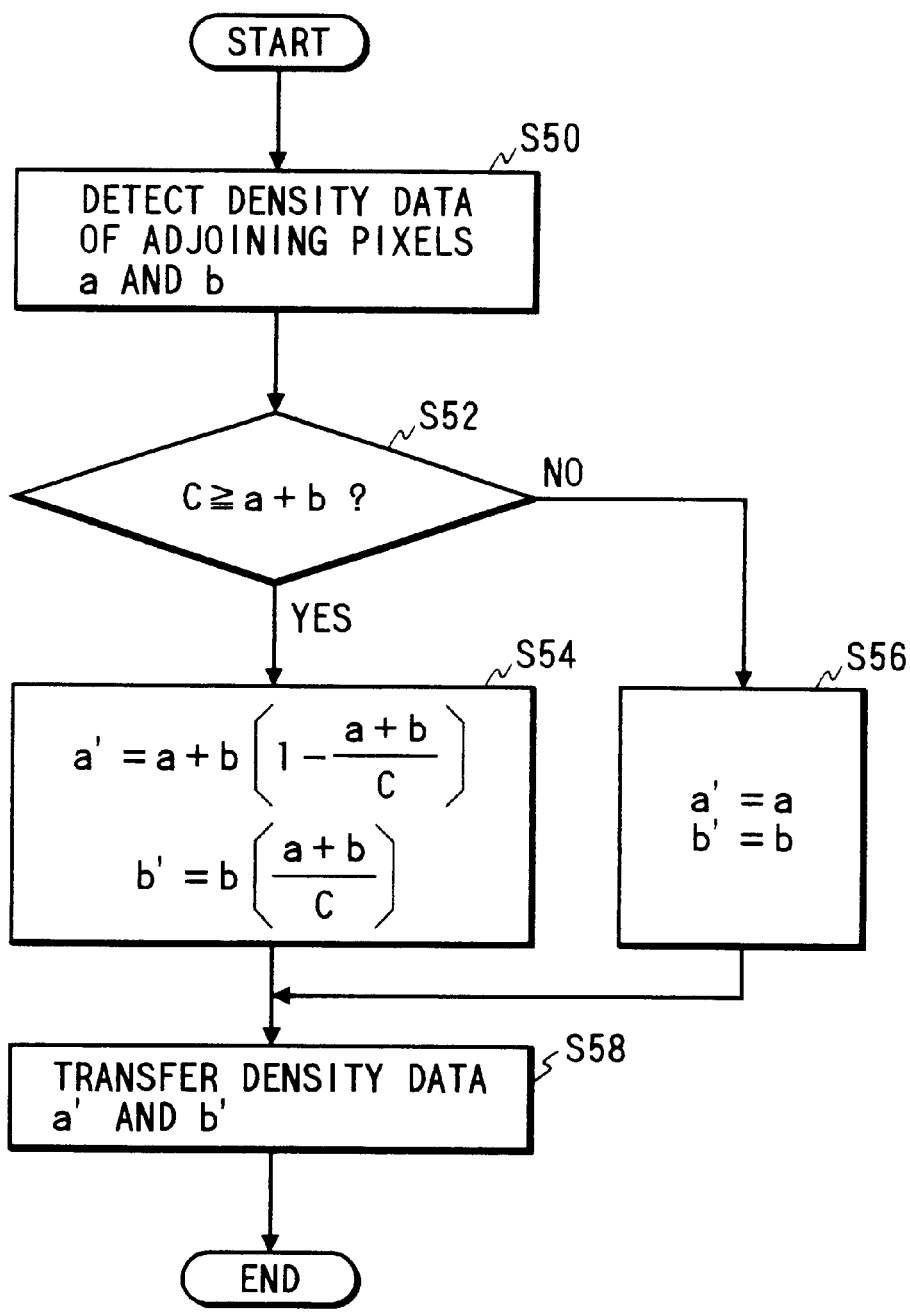
FIG. 11 is a flowchart showing the operation of a density processing unit of the form of the embodiment.

FIG. 11 is a flowchart showing the operation of the density processing unit of the form of the embodiment.

In step S50, the density data a and b of the adjoining pixels among the pixels arranged in the raster direction of the line memory 122 is detected.

In step S52, the sum (a+b) of the density data of the pixels is calculated on the basis of the density data of the pixels which were detected. When (a+b) is equal to or smaller than C (YES in step S52), the processing routine advances to step S54. When (a+b) is larger than C (NO in step S52), step S56 follows.

When (a+b) is equal to or smaller than C, in step S54, a' and b' are calculated as new density data in accordance with the equations (1) and are set to the density data of the pixels.

When (a+b) is larger than C, the detected density data a and b is set to the density data.

In step S58, the density data a' and b' is transferred to the light scanning unit 101 as density data of the image data.

By repeating the above operation, the image data which was sequentially stored in the line memory 122 is properly converted to a desired density by the density processing unit 123 and is transferred to the light scanning unit 101.

By modifying the equations (1), the transposition ratio of the pixel of the density data b can be also changed as shown by the equations (2).

$$a'=a+b[1-\{(a+b)/C\}x]$$
$$b'=b\{(a+b)/C\}x \quad (2)$$

For example, now assuming that the transposition ratio of the b density changes in accordance with an xth-order function (x is a positive real number of 1 or more), as the value of x increases, the transposition ratio of the density data rises, the gradation can be smoothly expressed in the highlight region, and the gradation reproducibility is improved. On the contrary, however, the resolution in the highlight region deteriorates. By setting the value of x so as to obtain a good balance about such a reciprocal effect, an image at a high picture quality can be outputted. A preferred value of x is set to 2 to 3.

As described above, in the density data a and b of the adjoining pixels in the region from the halftone density region to the highlight density region, since the pixel of the density data b is transposed to the pixel of the density data a in accordance with the equations (1) or (2), the pixel density of the main-scanning in the highlight density region is close to the half and the gradation reproducibility to the output image data for the input image data can be improved. As the density region approaches the image region of high density data, the output image data can be drawn at a high fidelity by the pixel density of the input image data, so that the resolution of the output image data can be improved. Further, since the transposition ratio from the pixel of the density data b to the pixel of the density data a is gradually changed, in the output image data, no gradation level difference occurs and the deterioration in picture quality due to the pseudo outline doesn't occur as well.

In the form of the embodiment, the case using the laser beam printer has been described. However, the invention can be also applied to an ink jet printer or the like for recording by an emission of an ink.

The value of x in the equations (2) can be also set from a console panel or a host computer.

The method shown in the embodiment can be applied to a system constructed by a plurality of equipment or can be also applied to an apparatus comprising one piece of equipment. It will be obviously understood that the invention can be also applied to a case where it is embodied by supplying a program to a system or an apparatus. In this case, a memory medium in which a program according to the invention has been stored constructs the invention. By reading the program from the memory medium to the system or apparatus, the system or apparatus operates in accordance with a predetermined method.

As described above, according to the embodiments, the image forming apparatus and method which can improve the gradation reproducibility while preferably preserving the resolution of the recording image data can be provided.

Further another embodiment of the invention will now be described. In this embodiment, there is disclosed an image processing method whereby even in an apparatus in which an image forming density of the image forming apparatus can be visually resolved in least distance of distinct vision, an image can be formed so that a linear density of a formed image cannot be visually resolved in least distance of distinct vision.

Although a construction of the image forming apparatus of the embodiment is similar to that shown in FIG. 7, it is now assumed that the image forming apparatus which is used in the embodiment can express 256 (=8 bits) gradations every pixel and that the image data has a resolution of 400 d.p.i. A resolution of the main-scanning direction of the image forming apparatus is set to 400 d.p.i.

In the density processing unit 123, in the case where the density data of two adjoining pixels in the raster direction (main-scanning direction) is set to a and b and the image density is equal to or less than the halftone density, namely, when the image density is smaller than C/2 [C denotes the maximum density of an image to be formed by the image forming apparatus] (C/2>a+b), the density data is transposed in accordance with the following arithmetic operations, thereby newly converting to the pixel having the density data of a' and b'.

All of the decimal portions of the values which are calculated by the arithmetic operations are omitted.

The odd trains of the data train in the subs-canning direction are set to $$d=(a+b)/2$$
$$a'=2d\{1-d/(C/2)\}$$
$$b'=2d^2/(C/2)$$

The even trains of the data train in the sub-scanning direction are set to $$a'=2d^2/(C/2)$$
$$b'=2d\{1-d/(C/2)\}$$

By setting as mentioned above, the dot arrangement in the low density region becomes a zigzag lattice arrangement and lines of a resolution which is equal to 283 l.p.i. (lines per inch) at an angle of 45° for the main-scanning direction are formed. Since those lines have a density of 250 d.p.i. or more as will be explained hereinlater, the density level is set to a level such that the dot structure cannot be confirmed by the human eyes in least distance of distinct vision.

Figure 12:
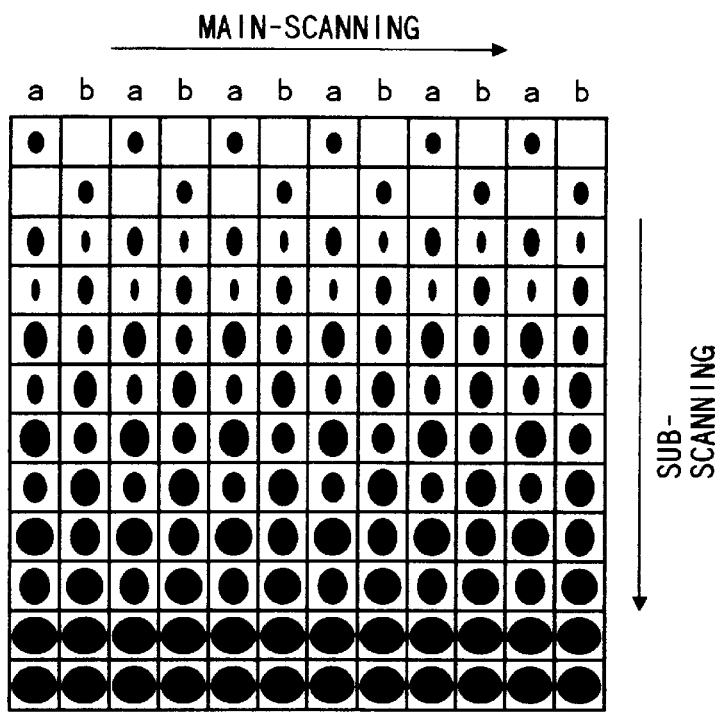
FIG. 12 is a diagram showing an output result of another embodiment of the invention.

By executing the above process, the output result at each gradation of the pixel of the density data a and the pixel of the density data b becomes as shown in FIG. 12.

FIG. 12 shows a dot pattern which is obtained by processing the image data of the density gradation which gradually increases from the top to the bottom, namely, from the upper position to the lower position in the sub-scanning direction.

At a low density, dots are formed like a lattice of an angle of 45° and have a construction of 45° and 283 l.p.i.

A limit which can be visually resolved by the human eyes in least distance of distinct vision (about 30 to 40 cm) is about 250 l.p.i. and the dot construction cannot be seen by the eyes.

In the electrophotography system, in case of individually forming two small dots, an unstable latent image state occurs; however, by collecting the dots from two pixels to one pixel at a low density as mentioned above, the pixel is formed by one larger dot, so that a reproducing state of dots becomes stable and an effect of reduction of image noises is obtained.

That is, since the dot reproducing state becomes stable, a variation in size of each dot is eliminated. In case of forming a uniform image of a uniform halftone density "125" when the maximum density level assumes, for example, "255", so long as the sizes of dots are inherently uniform, a smooth image which hardly has what is called, a noise feeling is obtained. However, there is a problem such that if the sizes of dots are not uniform, an image with a noise feeling is formed.

On the other hand, according to the method of the embodiment, since the dots are collected from two pixels to one pixel at a low density, the stable dots can be formed as mentioned above and an effect of reduction of the image noises can be obtained.

Further, by previously setting the mean value of two pixels to $d=(a+b)/2$, in case of the image density data obtained by scanning a printed matter, there is a difference of a large value between the density data a and b. Further, there is obtained an effect to prevent the occurrence of a situation such that when the period is almost a multiple of two pixels, there is a fear of occurrence of a deviation in a' and b' which are finally calculated, so that the correct density cannot be reconstructed.

The above processes will be described with reference to a flowchart of FIG. 14.

In step S50, the density data a and b of the adjoining pixels [the odd-number designated pixel and the even-number designated pixel] among the pixels arranged in the raster direction in the image data of a plurality of lines stored in the line memory 122 is detected.

In step S51, on the basis of the density data of the pixels which was detected, the sum (a+b) of the density data of the pixels is calculated. When (a+b) is equal to or smaller than C/2, the processing routine advances to step S52. When (a+b) is larger than C/2, step S56 follows.

When (a+b) is equal to or smaller than C/2, d is calculated in step S52. When the sub-scanning is performed for the odd pixel in step S53, the processing routine advances to step S54. If NO in step S53, namely, the sub-scanning is performed for the even pixel, step S57 follows.

In steps S54 and S57, a' and b' are calculated by the equations shown above and are set to the data of the pixels.

When (a+b) is larger than C/2, the density data a and b detected in step S56 is set to the data of the pixels.

In step S55, the density data a' and b' is transferred to the light scanning unit 101 as density data of the images.

A check is made to see if the processing of the image data stored in the line memory 122 has been finished (S59). If NO, the processing routine is returned to step S50 and the foregoing processing steps S50 to S55 are repeated. When the processing is finished, a check is made to see if the data of the next line exists (S61). If NO, the processing routine is finished. When the data of the next line exists, the data of the next line is inputted (S63).

It is also possible to construct to change the transposition ratio of the density data by calculating equations different from the foregoing equations.

Figure 14:
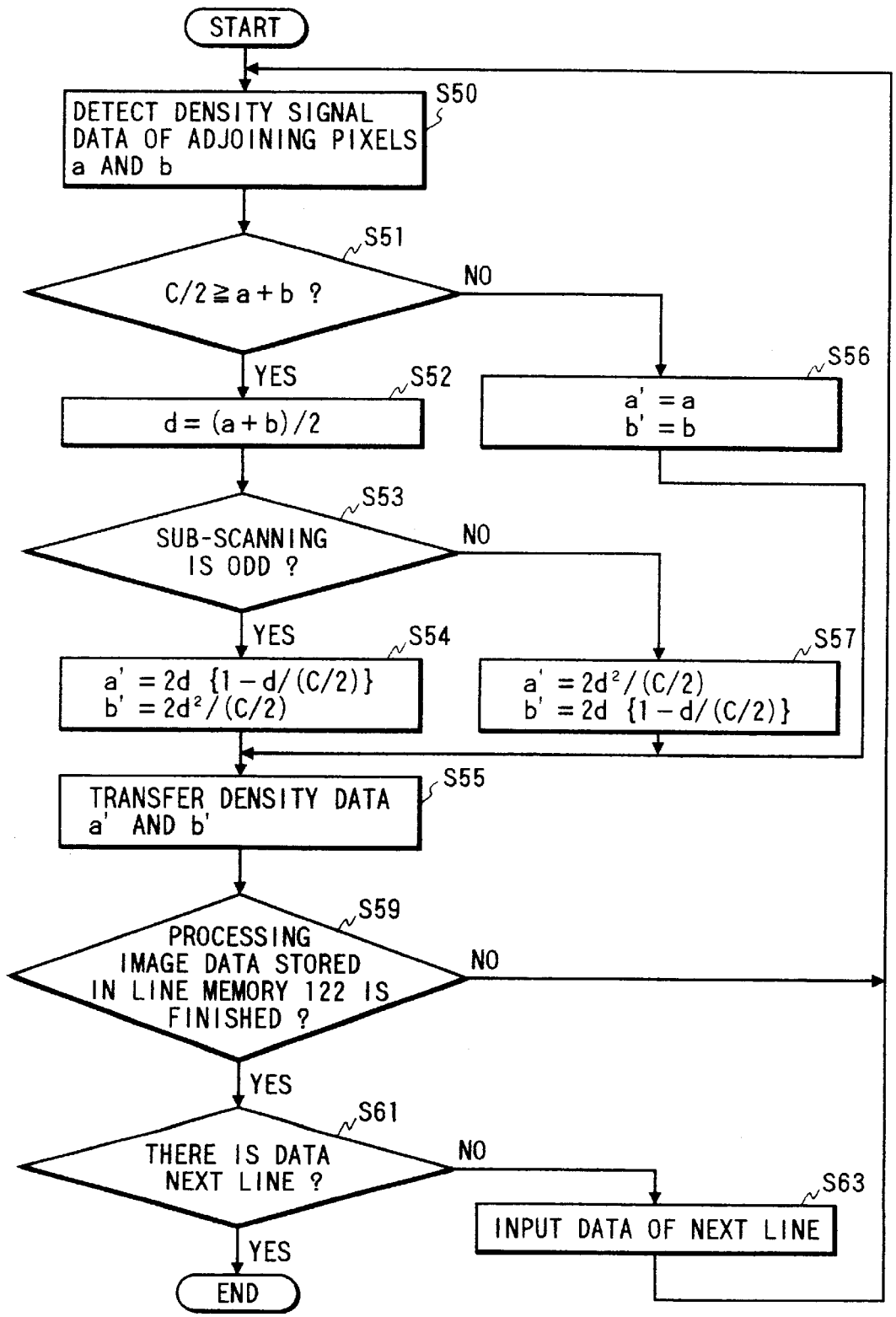
FIG. 14 is a flowchart showing a processing procedure to obtain an output result shown in FIG. 12.

In the embodiment, the transposition of the image data for concentration of the dots has been performed by the calculating equations shown in steps S54 and S57 in FIG. 14. According to the calculating equations, however, a degree of concentration of the dots doesn't linearly change but non-linearly changes in accordance with the level of the image signal.

Therefore, the dots can be efficiently concentrated and a large effect is obtained.

Further, as shown in an embodiment, which will be explained hereinlater, when a color image is formed, particularly, with respect to the black component, different from the other color components, there is an effect such that by increasing the degree of concentration of the dots, the picture quality is improved.

Figure 13:
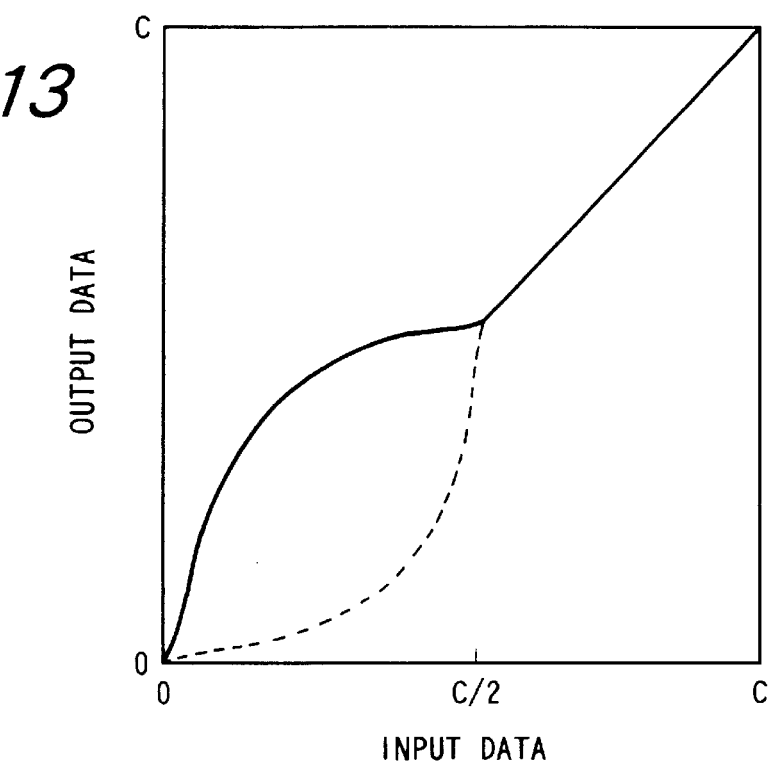
FIG. 13 is a diagram showing density converting characteristics of the embodiment shown in FIG. 12.

FIG. 13 shows image density converting characteristics in the case where the processing steps S51 to S54 and S57 shown in FIG. 14 were executed. A solid line shows the characteristics of a when the sub-scanning is performed to the odd pixel, that is, line number of the sub-scanning direction is odd and a broken line shows the characteristics of b. When the sub-scanning is performed to the even pixel, that is, line number of the sub-scanning direction is even, the solid line shows b and the broken line shows a.

Other Embodiments

The embodiment relates to the case where the invention is applied to a full color image forming apparatus of the electrophotography system having a plurality of drums.

In the full color image forming apparatus of the electrophotography system, processing steps until an image is formed will now be described.

Figure 15:
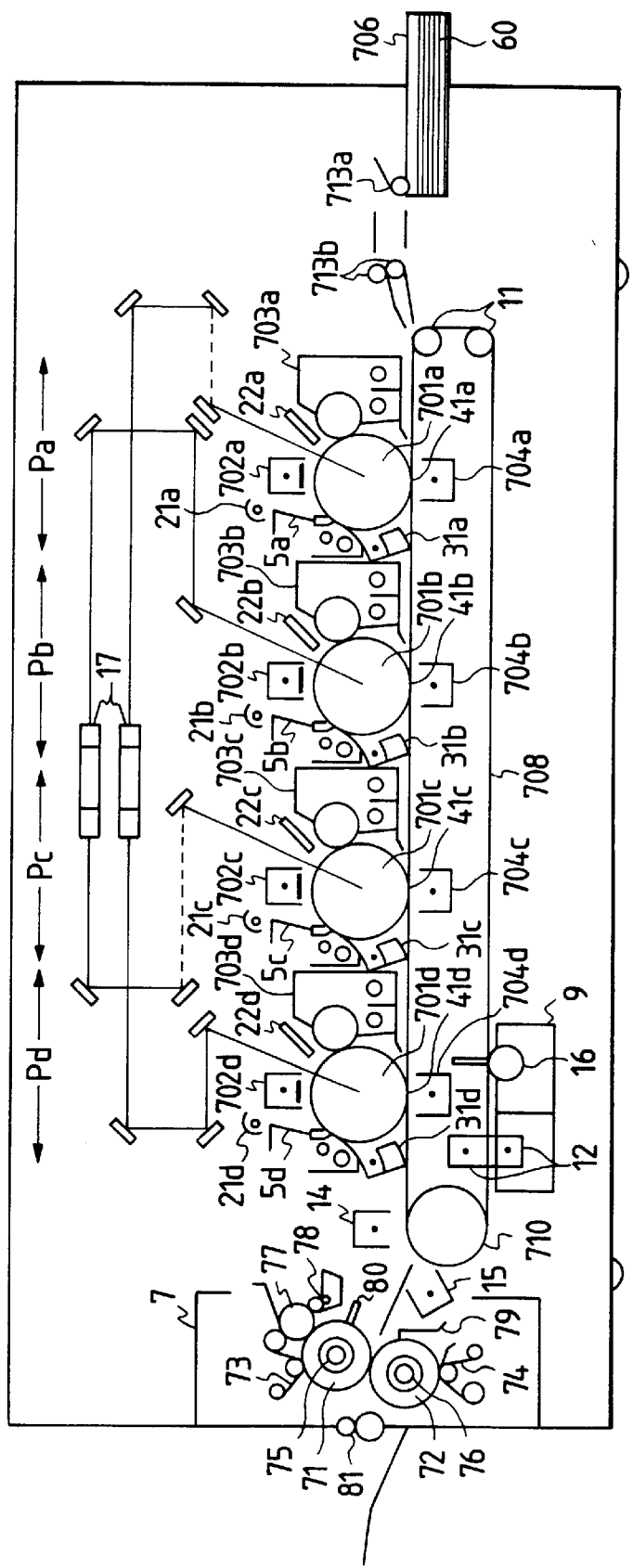
FIG. 15 is a cross sectional view showing a construction of still another embodiment of the invention.

FIG. 15 is a cross sectional view showing a construction of the full color image forming apparatus of the electrophotography system of the embodiment.

The apparatus comprises four stations to form images of four colors of magenta, cyan, yellow, and black. Photosensitive drums 701a to 701d are uniformly charged by primary charging units 702a to 702d. Laser beams emitted from semiconductor lasers (not shown) driven by image signals of the respective colors are scanned and exposed onto the photosensitive drums 701a to 701d by a polygon mirror 17, thereby forming latent images.

The latent images are developed by developing units 703a to 703d, so that toner images are formed on the photosensitive drums 701a to 701d.

A recording material 706 put on a recording material tray 60 is picked up by a pickup roller 713a and conveyed into the apparatus by a registration roller 713b. The toner images formed on the drums 701a to 701d are transferred onto the recording material 706 which is conveyed by a transfer belt 708. The recording material is subsequently conveyed. Registration timings of a plurality of color images on the recording material 706 are matched and images are sequentially multiple transferred by transfer charging units 704a to 704d. The transfer sheet 708 is separated by a separation charging unit 14 and by a curvature of a transfer sheet holding roller 710 and is fixed onto the recording material by a fixing roller 71 and a pressurizing roller 72. The recording material is subsequently ejected to the outside of the image forming apparatus.

A fixing step will now be described in detail.

The fixing roller 71 is formed by coating a silicon rubber and a fluorine rubber onto the surface of a metallic pipe. The pressurizing roller 72 is formed by coating a silicon rubber onto the surface of a metal roller. Halogen heaters 75 and 76 are controlled by a thermistor 79 attached to the surface of the pressurizing roller 72 and by a temperature control circuit (not shown), thereby controlling the surface temperature to a predetermined value suitable for fixing.

A silicon oil in an oil pan is pumped and moved to an oil coating roller 77 through a pumping roller 78. By sequence controlling the contact and removal between the oil coating roller 77 and the fixing roller 71 and by an oil control blade 80, a predetermined amount of oil is held on the fixing roller 71.

Each of cleaning devices 73 and 74 uses a belt-like cleaning web member and can always perform the cleaning by a fresh surface by the feeding and take-up of the web.

In the full color image formation as shown here, the registration of each color is an important item. It is well known that even if the registration of one color is deviated, the picture quality largely deteriorates.

Particularly, in the case where a gray image having a large area of a certain degree at small ratios of cyan, magenta, yellow, and black as image forming colors is formed, a color variation easily occurs.

To solve such a problem, according to the embodiment, the phase of a pattern period of the dot formation is changed by the image forming color.

Figure 16:
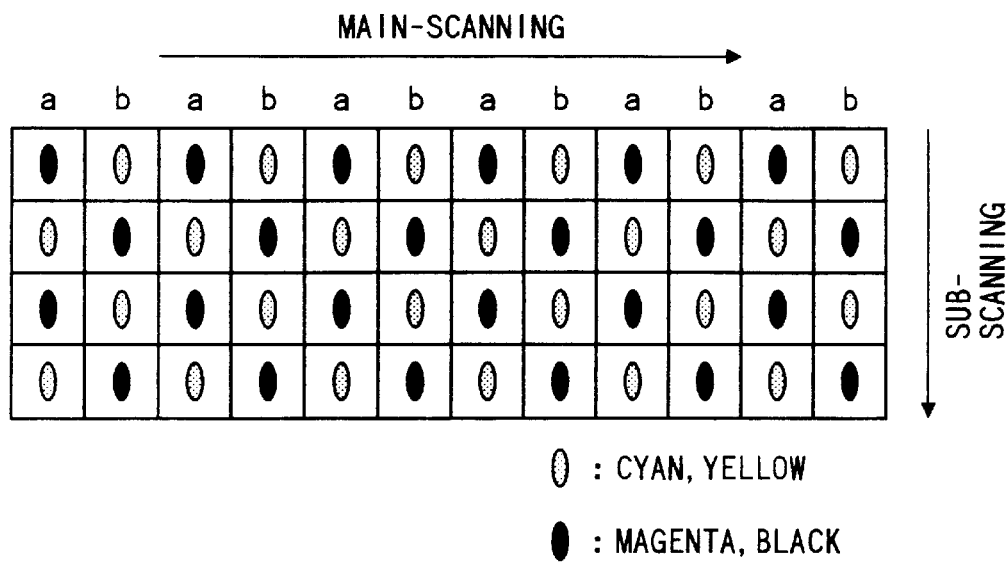
FIG. 16 is a diagram showing an output result of color dots formed according to the apparatus shown in FIG. 15.

FIG. 16 shows an example of formation of a specific dot construction pattern.

Black circles indicate dots of magenta and black and the dot pattern is formed by the same algorithm as that of the embodiment shown in FIG. 14.

Mesh circles indicate dots of cyan and yellow and the phase of the dot pattern is inverted from the phase of the black circle and the dot pattern is formed. To form such a pattern, when embodying the procedure shown in the flowchart of FIG. 14, it is sufficient to execute the processes of FIG. 14 for the image data of magenta and black and to execute the processes in which the processing steps S54 and S57 in FIG. 14 are exchanged for the image data of cyan and yellow.

By alternately arranging the coordinate positions of the dots in dependence on the colors, an allowance degree of the deviation of the registration within a range of the size of the lattice is widened. On the other hand, when four colors are overlaid at the same coordinates, a saturation deteriorates. Namely, since the black dot is overlaid to the dots of magenta, cyan, and yellow, color information to be reproduced by the color dots drops and the saturation deteriorates.

However, according to the dot construction pattern shown in FIG. 15, the black dot fundamentally is not overlaid to the dots of magenta and cyan. Or, a probability such that the black dot is overlaid is small. Therefore, at least the drop of the color information of magenta and cyan can be prevented.

Even if the relation between the color and the phase at the dot forming position is changed to another combination as shown in, for example, FIG. 15, a similar effect is also obtained.

Effects of the embodiment will now be described with reference to FIGS. 16 and 17.

Figure 17:
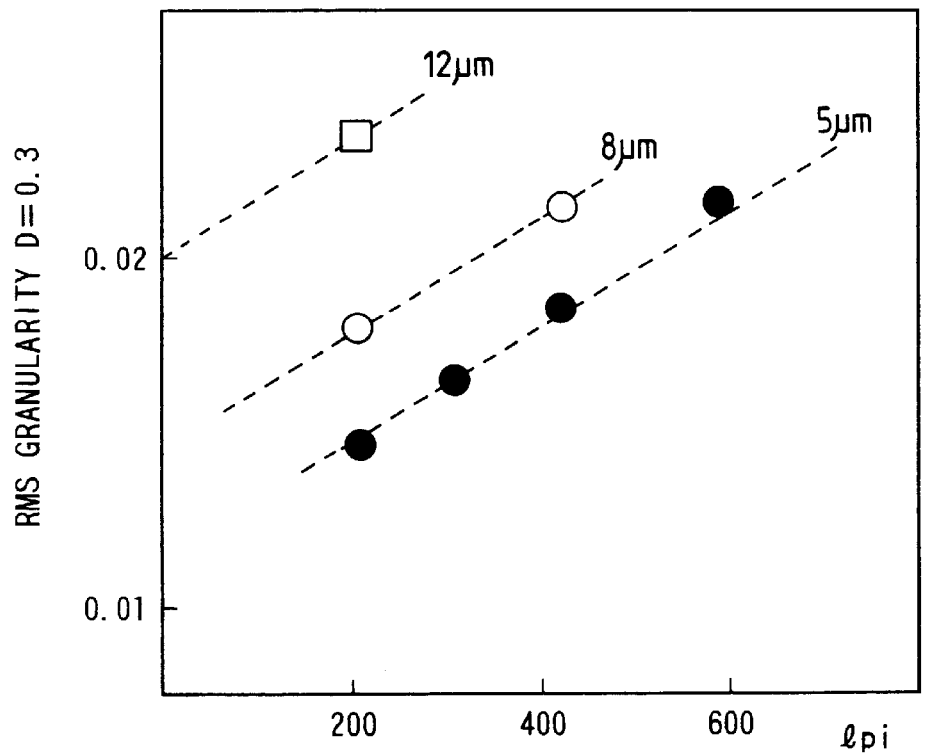
FIG. 17 is a diagram showing the relation between a toner grain size and an RMS granularity.

FIG. 17 is a diagram showing the relation between a toner grain size and an RMS granularity.

An axis of abscissa of FIG. 17 shows the number of lines of a screen (l.p.i.) and an axis of ordinate indicates the RMS granularity.

Toners in which the average toner grain sizes are equal to 12, 8, and 5 $\mu$m are used and their RMS granularities are plotted while changing the number of lines of the screen.

The RMS granularity is a parameter which is often used in case of measuring a roughness, namely, image noises in a silver-salt photograph or the like. Samples of a uniform pattern of the image density D=0.3 are used. The scanning densities are measured by an aperture of a size of 100 $\mu$m×100 $\mu$m and the RMS granularity is calculated by obtaining the standard deviation of the density data at about 1000 measuring points.

Therefore, it will be understood that as a numerical value of the granularity is large, a noisy image having a rough feeling is formed.

According to a subjective evaluation, when the granularity has a value larger than 0.02, the image is evaluated so that it has a picture quality which cannot be accepted. To set the granularity to a value smaller than 0.02, when extrapolating from the graph data, it is preferable that the average toner grain size is smaller than 10 $\mu$m in the case where the number of lines of the screen is equal to 200 l.p.i.

FIG. 18 shows visual sense MTF characteristics in least distance of distinct vision (about 35 cm). An axis of abscissa denotes the resolution and an axis of ordinate indicates the MTF.

Referring to FIG. 18, it will be understood that in case of observing by the eyes in least distance of distinct vision, it is impossible to resolve at 11 lines/mm, namely, about 250 l.p.i. By increasing the number of lines of the screen to a value larger than 250 l.p.i., the density level is set to a level at which the dot structure is not recognized by the observer.

In the embodiment of the invention showing the dot forming pattern in FIG. 12 mentioned above, since an image is formed at an angle of 45° and a resolution of 283 l.p.i., it is possible to prevent that the dot structure is recognized by the observer.

As shown in FIG. 17, as a tendency of the toner grain size, as the toner grain size is small, it is advantageous with respect to a roughness. Even if the number of lines is increased, there is a tendency such that the roughness is improved.

Explanation will now be made on the basis of the data verified by the commercially available apparatus which has already been designed and by model apparatuses made on an experimental basis by the inventors who applied the method disclosed in the embodiment.

The types shown by A, B, and C in FIG. 19 relate to the commercially available apparatuses. Laser beam sizes and toner grain sizes corresponding to the types are set to the values as shown in the diagram. According to the commercially available types, the image processing shown in the present specification and drawings is not adopted.

On the other hand, according to the apparatus of the F type of the present invention, the laser beam size is equal to 45 $\mu$m×65 $\mu$m and the toner grain size lies within a range from 5 to 6 $\mu$m. Further, the image processing method shown in the specification is adopted.

According to the embodiment, the toner of the grain size of 5 $\mu$m is adopted from the above characteristics, the image signal of 400 l.p.i. is used, the image processing to concentrate the dots is performed, an image is formed at an angle of 45° and a resolution of 283 l.p.i. Thus, the image noises are reduced as much as possible. The image in which the dot structure cannot be recognized under the ordinary observing conditions could be formed.

Although the image was formed under the above conditions according to the embodiment, it will be obviously understood that there is a larger effect by adopting smaller toner in future.

According to the embodiment as described above, there are provided the scanning means for scanning a digital image signal necessary to form a color image and forming an image, comparing means for comparing the scanned digital image signal with a predetermined image signal value, and modulating means for modulating the signal in accordance with the image signal for a group of pixels divided to a predetermined size and expressing an image dark/light state, wherein in the system in which as a result of the comparison by the comparing means, when the image signal is smaller than the predetermined signal value, the signal value is modulated by the modulating means in the pixels divided into the predetermined size, the size of the pixel group divided into the predetermined size is set to a size which cannot be visually resolved in least distance of distinct vision, there are advantages such that the gradation reproducibility in the low density region is improved, the density information preservation is improved, and the image noises are reduced.

What is claimed is:

1. An image forming apparatus comprising a photosensitive material, a charging system arranged to apply appropriate charging to the photosensitive material, means for a light scanning unit, and a developer unit, in which a multi-potential latent image is formed on said charged photosensitive material by a light scan effected by said light scanning unit, a visible image is formed by said developer unit depositing a developing agent onto the multi-potential latent image, and the visible image is transferred to a transfer material and is outputted, wherein said light scanning means includes exposure amount modulating means for modulating an exposure amount in accordance with pixel density information and expressing an image dark/light state for pixels on said photosensitive material divided into a predetermined size, and wherein said exposure amount modulating means divides an image density region into two or more of a highlight density region, a halftone density region, and a dark density region, and said image forming apparatus further comprising changing means for distributing a portion of a density value of one of two pixels adjacent to each other in light scan direction in the highlight density region to the density value of the other pixel, thereby changing the density value of the two pixels, wherein when C>a+b is satisfied, said changing means calculates a' and b' as new pixel densities satisfying the following equations:

$$a'=a+b[1-\{(a+b)/C\}N]$$

$$b'=b\{(a+b)/C\}N$$

where a is the density value of one of the two pixels, b is the density value of the other pixel, C is the maximum density value of an image which said image forming apparatus forms, and N is a positive integer.

2. An apparatus according to claim 1, further comprising an output unit, adapted to output the image data of every pixel calculated by said changing means to a visible-image reproducing device.

3. An apparatus according to claim 2, wherein said visible-image reproducing device is a printer.

* * * * *

UNITED STATES PATENT AND TRADEMARK OFFICE
CERTIFICATE OF CORRECTION

PATENT NO. : 6,765,692 B1
DATED : July 20, 2004
INVENTOR(S) : Jun Koide et al.

It is certified that error appears in the above-identified patent and that said Letters Patent is hereby corrected as shown below:

Column 10,
Line 56, "subs-canning" should read -- sub-scanning --.

Signed and Sealed this

Twenty-sixth Day of April, 2005

JON W. DUDAS
*Director of the United States Patent and Trademark Office*